US008028615B2

(12) United States Patent
Busse

(10) Patent No.: US 8,028,615 B2
(45) Date of Patent: Oct. 4, 2011

(54) CLAMPING DEVICE AND A REGULATING DEVICE

(75) Inventor: Herbert Busse, Stuttgart (DE)

(73) Assignee: Herbert Hänchen GmbH & Co. KG, Ostfildern (DE)

( * ) Notice: Subject to any disclaimer, the term of this patent is extended or adjusted under 35 U.S.C. 154(b) by 1591 days.

(21) Appl. No.: 10/496,813

(22) PCT Filed: Nov. 26, 2002

(86) PCT No.: PCT/EP02/13304

§ 371 (c)(1),
(2), (4) Date: Nov. 29, 2004

(87) PCT Pub. No.: WO03/046389

PCT Pub. Date: Jun. 5, 2003

(65) Prior Publication Data

US 2011/0107907 A1 May 12, 2011

(30) Foreign Application Priority Data

Nov. 27, 2001 (DE) ................................. 101 58 844

(51) Int. Cl.
*F15B 15/26* (2006.01)
*F16B 1/02* (2006.01)

(52) U.S. Cl. ................................................ 92/28; 92/26

(58) Field of Classification Search ................ 92/15, 24, 92/26, 27, 28

See application file for complete search history.

(56) References Cited

U.S. PATENT DOCUMENTS

| | | | | | |
|---|---|---|---|---|---|
| 3,643,765 | A | * | 2/1972 | Hanchen | 92/26 |
| 3,995,534 | A | * | 12/1976 | Rastetter | 92/27 |
| 5,540,135 | A | * | 7/1996 | Goellner | 92/28 |
| 6,152,268 | A | * | 11/2000 | Goellner et al. | 92/28 |

FOREIGN PATENT DOCUMENTS

| | | | | |
|---|---|---|---|---|
| DE | 35 23 676 | A | | 1/1987 |
| DE | 3523676 | A1 | * | 1/1987 |
| DE | 37 07 046 | A | | 9/1988 |
| GB | 1 263 120 | A | | 2/1972 |

* cited by examiner

*Primary Examiner* — Thomas E Lazo

(74) *Attorney, Agent, or Firm* — Lathrop & Gage LLP

(57) ABSTRACT

The invention relates to a clamping device for a rod which moves in an axial translatory or rotating manner. Said clamping device comprises a housing, a clamping sleeve which is axially fixed therein, a tensioning piston which can be displaced in the housing embodied as a cylinder, and a spring device for pre-tensioning the piston in the direction of the clamping sleeve in the locking state. Said spring device includes at least one helical plate spring which, in the event of a fracture, maintains the holding force and the dynamic course of the same. In one embodiment, the at least one helical plate spring is coaxially arranged in relation to the rod. In another embodiment, a plurality of helical plate springs are arranged on the circumference of the rod such that they are parallel with the axis thereof, for distribution of a pre-tensioning force acting on the spring device.

18 Claims, 5 Drawing Sheets

CLAMPING DEVICE AND A REGULATING DEVICE

FIELD OF THE INVENTION

The present invention relates to a clamping device and a regulating device, particularly a working cylinder, having a piston rod.

BACKGROUND

Certain clamping devices for axially movable rods, e.g. piston rods of working cylinders, or fixed rods, are known. A clamping device of this kind is described in DE 37 07 046 A1. Clamping devices of this kind are connected to a moving component or device relating to the rod which is to be clamped, and the clamping force is generated for example by means of a tensioning piston with an inner cone and a clamping sleeve with an outer cone. As the level of clamping force is directly dependent on the level of spring force, sets of plate springs are always used for high retaining or clamping forces in the prior art, which depending on the requirements consist of single- or multi-layer plate springs lined up in rows in alternate directions and are arranged coaxially.

The mode of operation under high forces is as follows. To release the clamping sleeve from the rod, the tensioning piston is pushed by hydraulic pressure counter to the spring force of the spring assembly, so that the clamping sleeve is no longer acted upon at its outer cone and the rod is thus released. To initiate the clamping action, i.e. to act on the outer cone of the clamping sleeve, the hydraulic pressure is removed, so that the spring force of the spring assembly can come into effect.

Problems arise with clamping devices of this kind particularly when one of the plate springs forming the spring assembly breaks, as this causes the spring unit as a whole to lose most of its bias. This is associated with a loss of the ability to transmit force to the tensioning piston and consequently a substantial reduction in the clamping force or retaining force.

On the other hand, bodies concerned with safety in the workplace, such as the professional and trade associations, demand that when any operational locking/securing mechanisms are used for presses and injection moulding machines, there must be no loss of the safety function even if a spring should break, i.e. the retaining force of the clamping device and hence the dynamic course should still be preserved. Particularly in the field of presses and injection molding machines referred to above, where the clamping and retaining mechanisms have to withstand very great forces which could endanger the lives of the operating staff, it is essential to comply with these professional requirements, which determine whether a clamping device will be authorized and released for use.

In the past, clamping devices for meeting these requirements were fitted with a clamping jaw arrangement which allows a hydraulically driven piston rod to be safely secured. A clamping jaw arrangement of this kind is known for example from published German application DE-OS 23 33 491. A disadvantage of the known clamping jaw arrangements is that in practice, when the clamping jaws are used, the forces applied frequently lead to jamming which can only be freed again with difficulty depending on the magnitude of the forces occurring and absorbed and sometimes lead to damage or even destruction of the apparatus, if the jamming is serious.

SUMMARY OF THE INVENTION

In view of the foregoing, a clamping device is provided; a regulating device with a spring assembly or clamping device is also provided.

A clamping device according to the invention, for a rod which is movable in axial translation and/or by rotation, includes a housing, a clamping sleeve which is axially secured in the housing, a tensioning piston movable in the cylindrical housing, and at least one helical plate spring which biases the piston towards the clamping sleeve into the locking position.

Helical plate springs per se are known from DE 29 16 446 A1. These are two helical springs wound edgewise and diagonally with respect to the central axis, which are screwed into one another in the reverse direction such that the flat strip of the spring coils inclined towards one another after they have been screwed together is stressed in the manner of a plate spring column.

The clamping device with helical plate springs according to the invention has the major advantage that even if the spring breaks no spring travel is lost and hence the spring force set remains virtually unaffected. This characteristic ensures a high degree of functional reliability in a clamping device in which the retaining force is generated by spring force so that, for example, the trade association requirements regarding the use of spring-action locking/lifting mechanisms for hydraulic presses and injection molding machines that use helical plate springs are satisfied.

Other advantages of the invention are:

- more favorable spring characteristics for the same amount of space
- the pre-stressing or biasing force is reduced by up to 10%, resulting in a correspondingly lower releasing pressure as there is virtually no spring friction
- there is no wear at the points of contact
- the one-piece construction from strip material with an uninterrupted fiber run has a favorable effect on the life of the spring element
- the one-piece construction is beneficial during assembly, and the risk of confusion when layering the individual plate springs to form the spring unit no longer arises
- lubricants are not required
- helical plate springs are cheaper.

The suitability of helical plate springs for use in clamping devices has been confirmed in exceptional manner by long-term trials over 2 million stress cycles.

An arrangement of several helical plate springs distributed paraxially around the circumference of the rod to be clamped has proved particularly advantageous. In this arrangement, the total spring force required is divided between a plurality of springs. This means that springs of relatively small diameter can be used even for applications which demand high pre-stressing or biasing force. This arrangement according to the invention makes it possible for the first time to use helical plate springs for applications of this kind, as helical plate springs are only supplied by the manufacturers as individual springs in sizes up to a rod diameter of about 50 mm. With this solution, it is now possible to produce very large spring-action clamping devices. Previously, these had to be operated hydraulically in the absence of plate springs of suitable size; but this meant accepting compromises in the operational reliability. A further aspect with regard to increasing the operational reliability is that in this multiple spring column arrangement the operational reliability is guaranteed even if there is total failure of a spring column, as the remaining spring columns will supply the necessary holding force if the springs are suitably designed.

Even more advantageous, spring characteristics can be achieved with the smaller helical plate spring units distributed around the periphery. In order to obtain the most favorable spring characteristics for clamping devices with the same equipment dimensions, according to further embodiments of the invention, indents may be provided in the tensioning piston and/or in a cover of the clamping device for accommodating one or both ends of the at least one helical plate spring. In another embodiment, local recesses with a base outline in the shape of a segment of a circle are provided in a bore of the housing which accommodates the spring assembly.

According to one embodiment of the invention, the at least one helical plate spring is guided by a bolt which guides the helical plate spring at its internal diameter only in the region of the ends of the spring. As a result the friction which occurs is negligibly small as the guiding takes place only at the ends of the spring.

In another advantageous embodiment of the invention, the at least one helical plate spring is arranged coaxially with the rod which is to be clamped. Using this embodiment, clamping devices can be constructed more easily up to a maximum rod diameter of 50 mm. Here again, in order to adjust the spring characteristics in relation to the space occupied, it has proved advantageous if indents for accommodating one or both ends of the helical plate spring are provided in the tensioning piston and/or in a cover of the clamping devices.

According to one embodiment of the invention, the at least one helical plate spring acts directly on the clamping sleeve, the outer cone of which acts upon an associated inner cone of the housing and the inner diameter of which decreases as a result of the axial displacement in the locked state, causing the movable rod to be securely clamped.

Further advantages and embodiments of the invention will become apparent from the description and the accompanying drawings.

It will be understood that the features mentioned hereinbefore and those still to be explained below may be used not only in the combinations specified but also in other combinations or on their own, without departing from the scope of the present invention.

The invention is schematically illustrated in the drawings by means of embodiments provided by way of example and is described hereinafter in detail with reference to the drawings.

DETAILED DESCRIPTION

Figure 1:
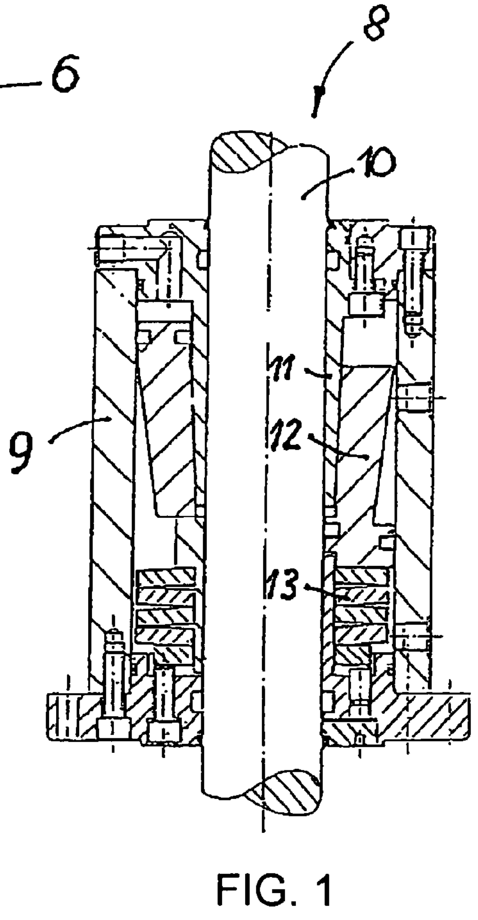
FIG. 1 (PRIOR ART)
FIG. 1 schematically shows a longitudinal section through a clamping device known from the prior art.

FIG. 1 shows a clamping device of the kind known from the prior art, particularly DE 37 070 46 A1. The known clamping device 8 has a three-part housing 9 in which a rod 10 can be clamped by means of a clamping sleeve 11. This clamping is done by means of a tensioning piston 12, which is supplied with a pre-stressing or biasing force by the action of a coaxially mounted plate spring unit 13. The clamping sleeve 11 is released by the supply of pressure medium to the tensioning piston 12, the force exerted by the pressure medium counteracting the pre-stressing or biasing force of the spring unit 13.

The plate spring unit is thus subjected to permanent pre-stressing in both the clamping and release positions; that is, all the plate springs forming the plate spring unit are pre-stressed by the same amount, the pre-stressing being higher in the release position. As the plate springs are connected one after the other, in the case of a single layer each spring exerts the total pre-stressing force on the tensioning piston.

If a spring breaks, the spring unit as a whole substantially loses its pre-stressing and hence its ability to transmit force to the tensioning piston. This sharply reduces the clamping force or retaining force.

If there are a number of plate springs located inside one another in the same direction, a similar effect occurs when a spring breaks; this arrangement is hardly ever used in practice because of the high friction between the plate surfaces touching one another, with the danger of friction corrosion occurring.

Figure 2:
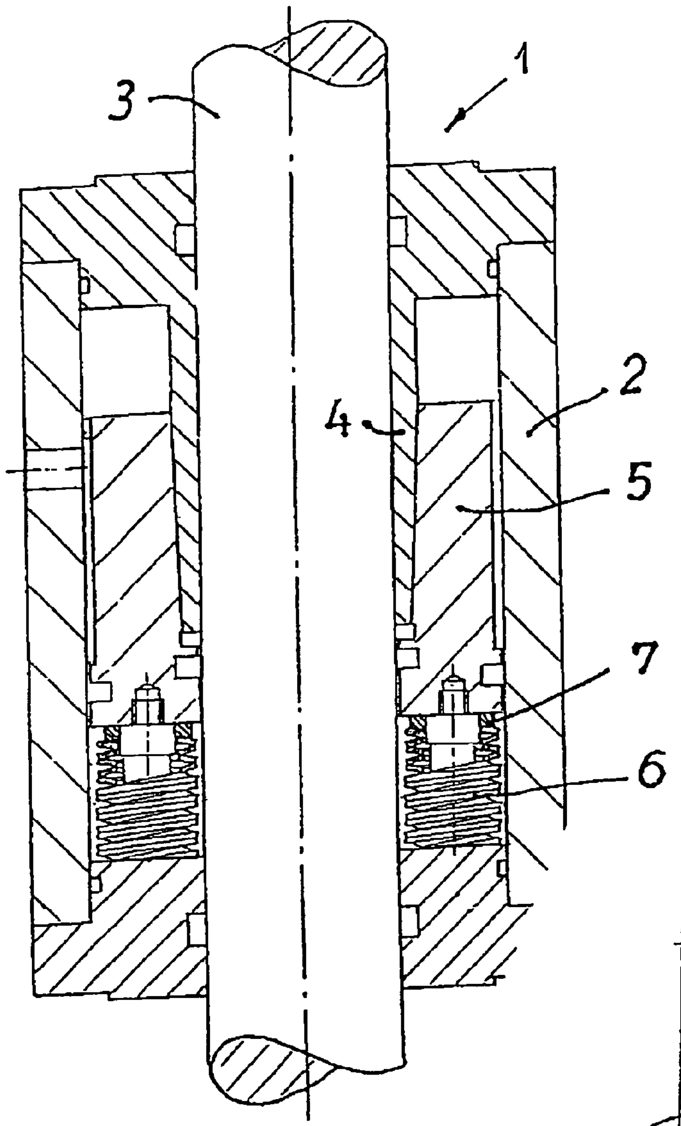
FIG. 2 schematically shows a longitudinal section through a clamping device according to the invention.

By contrast, FIG. 2 shows a longitudinal section through a clamping device 1 according to the invention.

The clamping device 1 according to the invention has a three-part housing 2 in which a rod 3 can be secured by means of a clamping sleeve 4. This clamping is done by means of a tensioning piston 5 which is acted upon by a plurality of helical plate springs 6 arranged paraxially around the circumference of the rod 3. The helical plate springs 6 arranged paraxially with respect to rod 3 generate the necessary pre-stressing or clamping force for clamping sleeve 4. To set the prescribed pre-stressing or biasing force, adjustment discs 7 are provided which are placed between the individual helical plate spring column and the tensioning piston 5.

Figure 4:
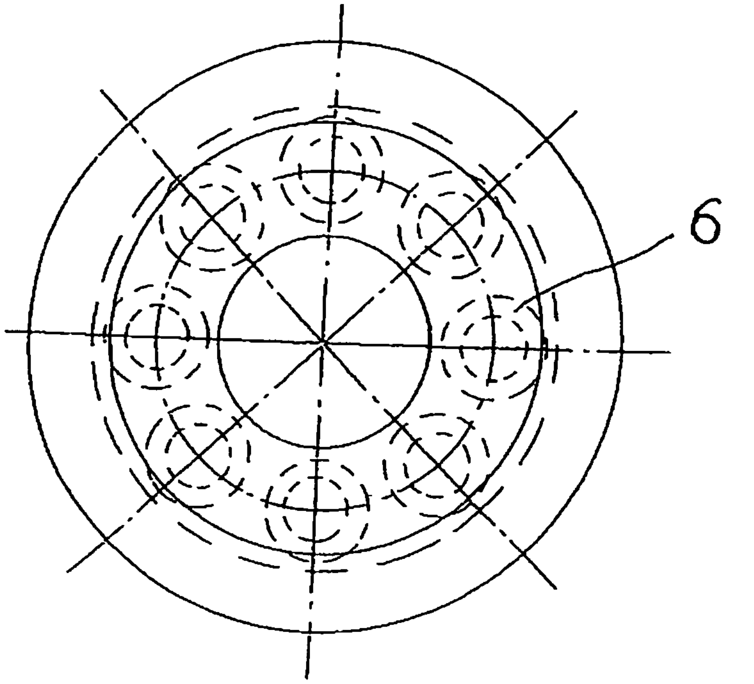
FIG. 4 shows a plan view of a clamping device according to the invention with helical plate springs distributed around the circumference.

The geometric arrangement of helical plate springs 6 according to the invention is shown in plan view in FIG. 4.

Figure 3:
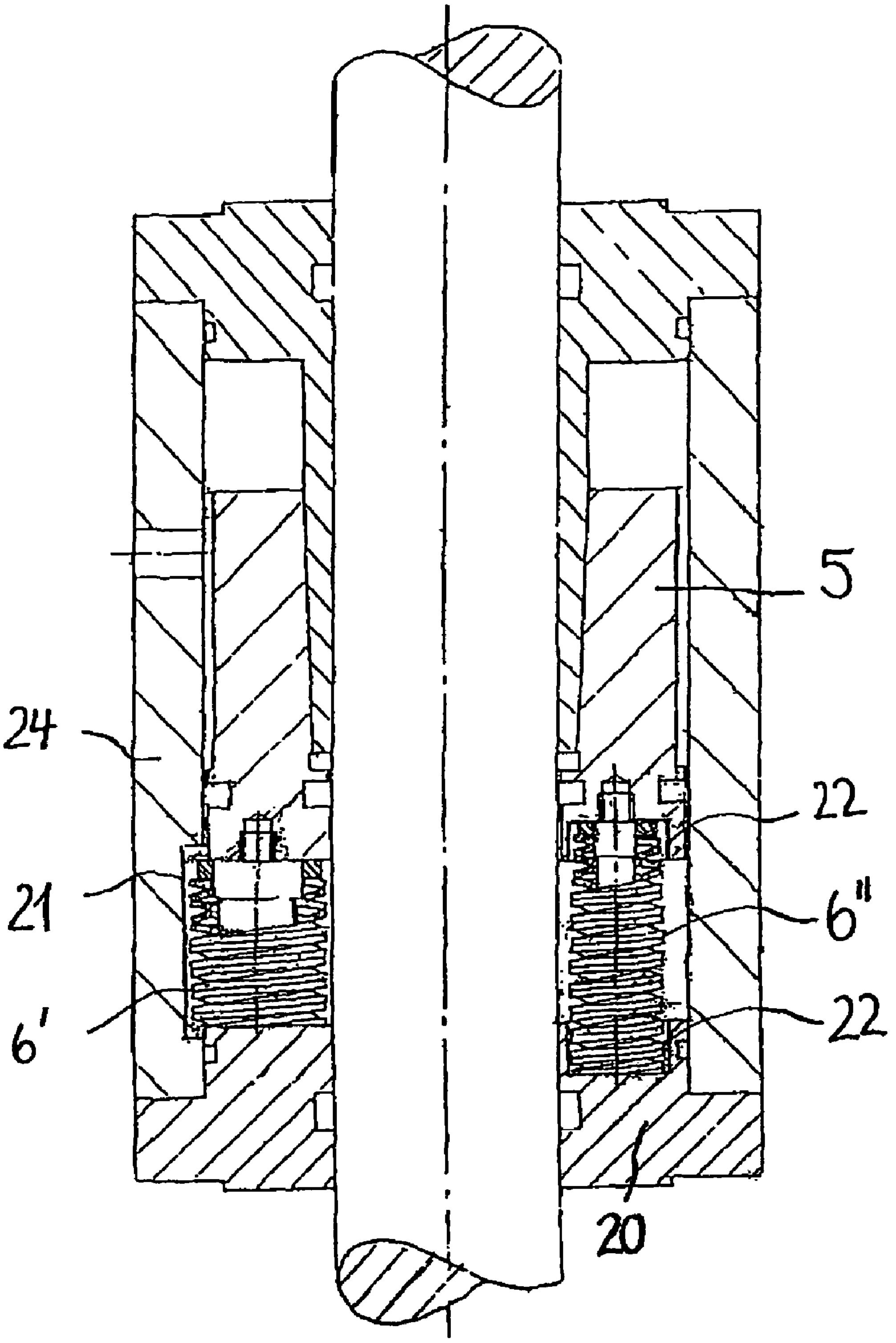
FIG. 3 shows a longitudinal section through a clamping device wherein two different embodiments of the arrangement of a helical plate spring column are shown on either side of the central longitudinal line.

FIG. 3 shows a longitudinal section through a clamping device according to the invention showing, on either side of the central longitudinal line, two different embodiments of the arrangement and guidance of the helical plate spring columns.

Figure 5:
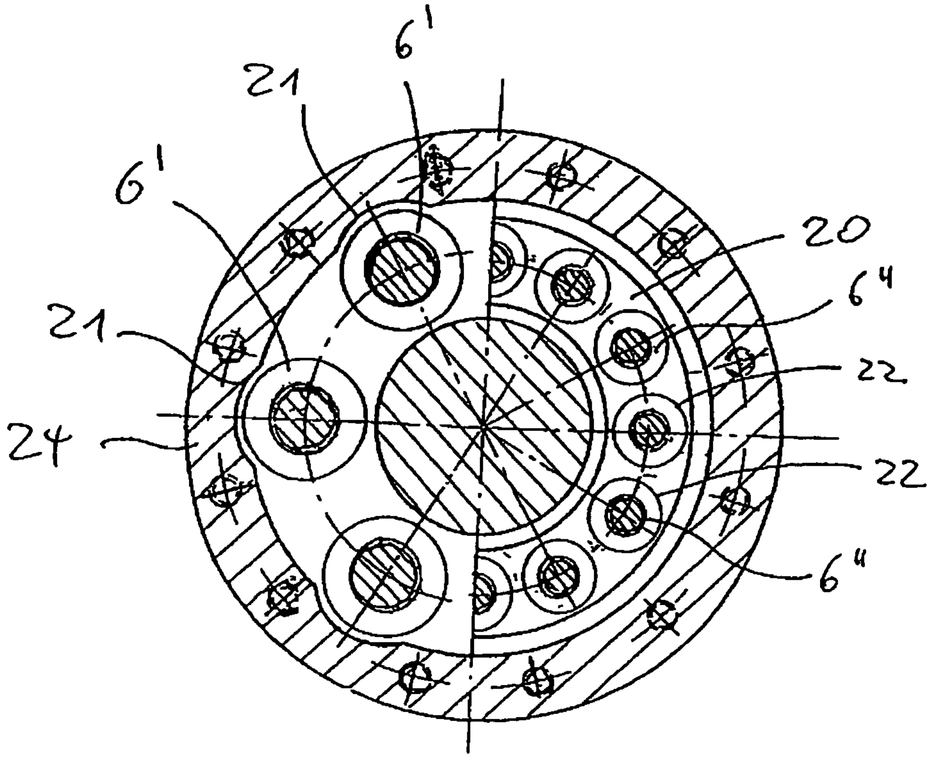
FIG. 5 shows a cross section through the clamping device of FIG. 3 at the level of the helical plate springs.

In the embodiment shown on the left of the central longitudinal line in FIG. 3, there is provided, in a tube 24 which forms the housing wall or housing casing, a recess 21 with a base outline in the shape of a segment of a circle, into which helical plate springs 6' project with part of their circumference. The recesses 21 allow the use of helical plate springs of larger diameter, thus making it possible to use helical plate springs of larger diameter with a clamping device housing of the same size, i.e. a clamping device with the same external dimensions, and thus generate a greater pre-stressing force. A plan view of the embodiment described including the recesses 21 with a segment-shaped base outline is shown in FIG. 5.

Another embodiment by way of example is shown in FIG. 3 to the right of the central longitudinal line. In this embodiment, indents 22 which accommodate the ends of helical plate spring columns 6" are provided in tensioning piston 5 and in a housing cover 20 of the clamping device. This makes it possible to use longer helical plate springs 6"—again while keeping the same external dimensions for the clamping device. A plan view of this embodiment is also shown in FIG. 5, to the right of the central longitudinal line.

Figure 6:
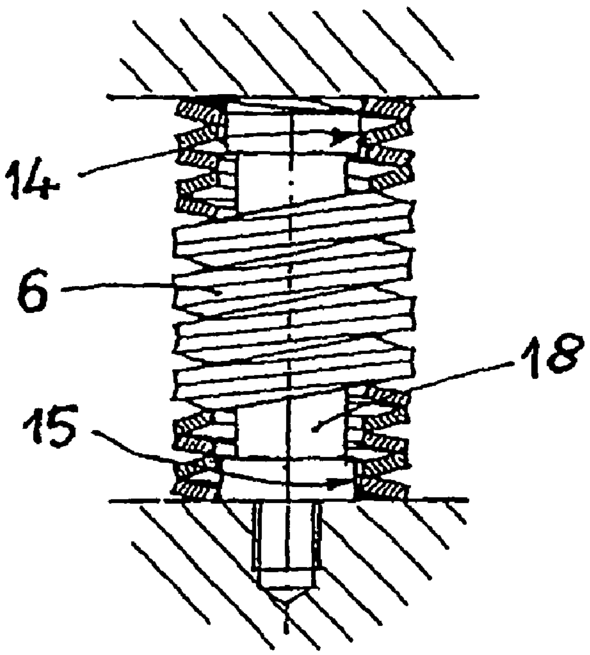
FIG. 6 is a side view, partly in section, of a helical plate spring which is guided by a bolt at its internal diameter, solely in the region of its spring ends.

Helical plate springs 6, 6', 6" are guided, for example, by means of bolts arranged coaxially inside the helical plate springs. According to the invention; these guide bolts are provided with angled shoulders in the region of ends 14, 15 of the helical plate springs, the external diameter of which corresponds approximately to the internal diameter of the helical plate springs, so that guidance by the bolt 18 takes place only in the region of spring ends 14, 15 (see FIG. 6). This substantially reduces the friction.

Figure 7:
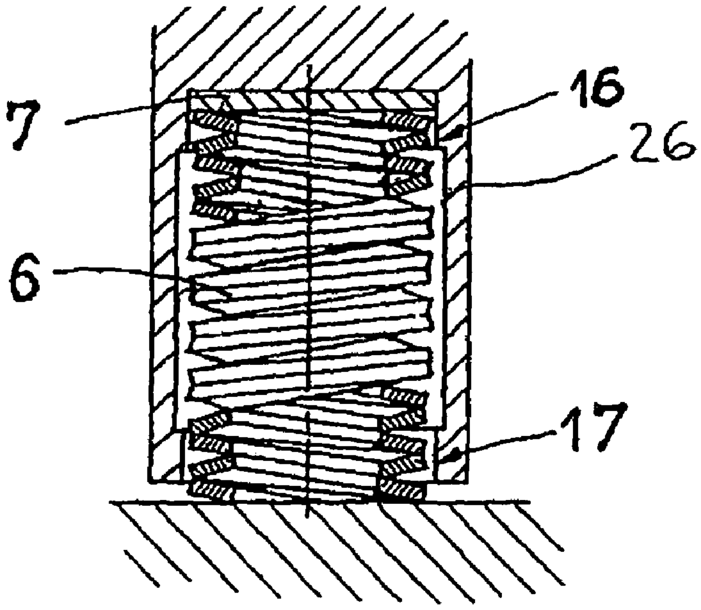
FIG. 7 is a side view, partly in section, of a helical plate spring which is guided in a bore/indent at its outer diameter, solely in the region of its spring ends.

Similarly, it is possible according to the invention to guide the helical plate springs not at their internal diameter but at their external diameter. This is done by mounting a helical plate spring 6 in a bore 26 which includes, in the region of spring ends 16, 17, shoulders that reduce the internal diameter of bore 26, the internal width of which corresponds roughly to the external diameter of the helical plate spring 6, so that the latter is guided in the region of the shoulders (see FIG. 7). Of course, this type of guidance may also be provided by means of two bores, each of which surrounds only one of the two spring ends 16 or 17 and acts on the outer diameter of the spring ends to guide them. These two bores may be, for example, the indents 22 of FIG. 3.

Figure 8:
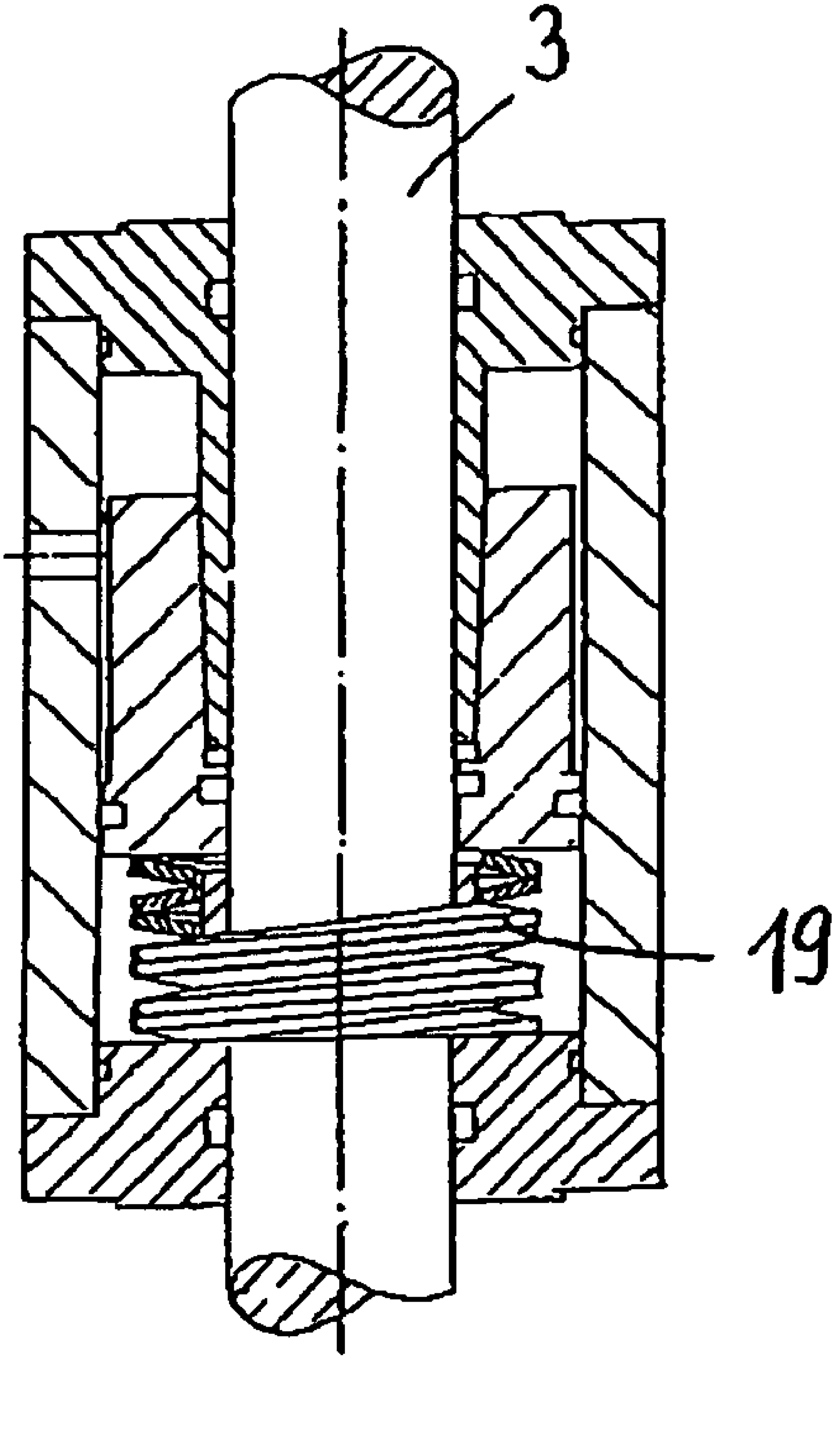
FIG. 8 is a longitudinal section through a clamping device with a helical plate spring arranged coaxially with the rod which is to be clamped.

Finally, FIG. 8 shows a longitudinal section through a clamping device according to the invention wherein a helical plate spring 19 is arranged coaxially with the rod 3 which is to be clamped.

What is claimed is:

1. A clamping device for a rod of the type that is movable in axial translation and/or by rotation, comprising:
- a housing;
- a clamping sleeve axially secured within the housing;
- a tensioning piston movable in the housing; and
- a spring assembly biasing the tensioning piston towards the clamping sleeve into a locking position,
- the spring assembly having a plurality of helical plate springs that maintain force against the tensioning piston in the event of breakage, the plurality of helical plate springs being arranged paraxially around the circumference of the rod.

2. A clamping device according to claim 1, the plurality of helical plate springs being paraxial with the rod to be clamped.

3. A clamping device according to claim 1, wherein one or both of (a) the tensioning piston and (b) a cover for the clamping device form indents for accommodating at least one end of each helical plate spring.

4. A clamping device according to claim 1, further comprising a bolt disposed within each one helical plate spring, wherein the helical plate spring is guided by the bolt at its internal diameter only in the region of the ends of the spring.

5. A clamping device according to claim 1, wherein the housing forms a base outline in the form of a segment of a circle to accommodate the spring assembly.

6. A clamping device according to claim 1, wherein one or both of (a) the tensioning piston and (b) a cover for the clamping device form indents for accommodating at least one end of each helical plate spring.

7. A clamping device according to claim 1, wherein the plurality of helical plate springs comprises two identical helical compression springs screwed into one another, each helical compression spring having a plate-spring-like cross section formed of strip steel.

8. A clamping device according to 1, each helical plate spring being guided at its external diameter only in the region of the ends of the helical plate spring.

9. A clamping device according to claim 1, the helical plate springs acting directly on the tensioning piston to generate a clamping force for the clamping sleeve, an outer cone of the clamping sleeve acting on an associated inner cone of the housing, and an inner diameter of the clamping sleeve decreasing as a result of the axial displacement in a locked state, leading to secure clamping of the rod.

10. A regulating device, comprising:
- a piston rod being movable in axial translation and/or by rotation; and
- a clamping device for clamping the piston rod,
- the clamping device comprising:
  - a housing;
  - a clamping sleeve axially secured within the housing;
  - a tensioning piston movable in the housing; and
  - a spring assembly biasing the tensioning piston towards the clamping sleeve into a locking position, the spring assembly comprising:
    - a plurality of helical plate springs which maintains holding force against the tensioning piston in the event of a breakage, the plurality of helical plate springs being arranged paraxially around the circumference of the rod.

11. A regulating device according to claim 10, the plurality of helical plate springs being arranged paraxially with the rod to be clamped.

12. A regulating device according to claim 10, wherein the housing forms a base outline in the form of a segment of a circle to accommodate the spring assembly.

13. A regulating device according to claim 10, further comprising a bolt for each helical plate spring, wherein each helical plate spring is guided by the corresponding bolt at its internal diameter only in the region of the ends of said spring.

14. A regulating device according to claim 10, wherein one or both of the tensioning piston and a cover of the clamping device form indents for accommodating one or both ends of one or more helical plate springs.

15. A regulating device according to claim 10, the plurality of helical plate springs comprising two helical compression springs with a plate-spring-like cross section comprising strip steel, screwed into one another.

16. A regulating device according to claim 10, each helical plate spring being guided at its external diameter only in the region of the ends of the spring.

17. A regulating device according to claim 10, the plurality of helical plate springs acting directly on the tensioning piston to generate a clamping force for the clamping sleeve, an outer cone of the clamping sleeve acting on an associated inner cone of the housing and an inner diameter of the clamping sleeve decreasing as a result of axial displacement in a locked state, leading to secure clamping of the rod.

18. A method of clamping a rod of the type that is movable in axial translation and/or by rotation, comprising:
- axially securing a clamping sleeve within a housing;
- biasing a tensioning piston towards the clamping sleeve with a plurality of helical plate springs arranged paraxially around the circumference of the rod, such that the tensioning piston reaches a locking position for the rod.

* * * * *